UNITED STATES PATENT OFFICE.

SAMUEL OTLEY, OF GRAND HAVEN, MICHIGAN.

IMPROVEMENT IN CEMENT FOR STEAM-JOINTS.

Specification forming part of Letters Patent No. 191,249, dated May 29, 1877; application filed November 29, 1876.

*To all whom it may concern:*

Be it known that I, SAMUEL OTLEY, of Grand Haven, in the county of Ottawa and State of Michigan, have invented certain new and useful Improvements in Cement for Steam-Joints; and I do hereby declare that the following is a full, clear, and exact description thereof.

This invention relates to that class of compounds or cements used for closing or sealing the joints of steam or other pipes, or various parts of steam engines or boilers, wherever a tight joint is required.

I am aware that many compounds are now in use designed to effect this same purpose, but, so far as they have come within my knowledge, they are open to serious objections, the greatest of which is their liability to become cracked or broken when the metal to which they are applied expands or contracts under the influence of heat or cold, consequently causing the joint or part to leak.

It has been my aim in making the compound or cement for which I now apply for Letters Patent to so combine certain ingredients as to absolutely avoid this tendency to crack, break, or loosen by reason of the expansion and contraction of the metal, the result of such combination being a substance which expands and contracts under the same influences which affect iron or other metals, and in about the same ratio.

Since first conceiving the idea of such a combination of ingredients, I have experimented largely with the compound, and have found that it works equally well upon the joints of pipes for conducting cold water or gas, having frequently been subjected to the test of hundred and eighty (180) pounds pressure to the square inch upon joints in cold-water pipes, said pressure being applied very soon after application of the cement. Upon steam-pipe joints I have tested it by turning on steam under pressure of two hundred (200) pounds to the square inch, immediately upon application of the cement to the joint or part. I have used it upon parts where much annoyance had previously thereto been occasioned by the use of rubber gaskets, to say nothing of the expense incurred in the frequent renewal of them, and have demonstrated its ability to securely hold the joint tight during a period of time in which ten (10) times the cost of the cement had been expended for rubber.

The ingredients of which my cement is composed, and the proportions of each, are:

Mineral paint, also commonly known as "Ohio mud," one (1) part; yellow ocher, one (1) part; Paris white, one (1) part; plumbago, one (1) part; brick-dust, one (1) part; litharge, one and one-half ($1\frac{1}{2}$) part.

My method of preparing this cement is to unite the hereinmentioned substances in powdered form, in the proportions as set forth, in any convenient vessel, and stir the same until thoroughly intermixed. I then add a sufficient quantity of boiled linseed-oil to render the mass of the consistency of stiff putty. It may then be put up in cans or other suitable receptacles for use.

When it is desirable to use the cement upon rough or uneven surfaces, as is frequently necessary, I work into the mass, before applying, a small quantity of fine-cut hemp, the amount of which may be left to the judgment of the person using it. This serves to make the particles adhere together more strongly, and also tends to make the cement adhere more firmly to the parts to which it may be applied—likewise increasing its elasticity.

I am aware that various compounds or cements have been used, and become subjects of Letters Patent, which contained some of the ingredients herein named; but, as hereinbefore set forth, I have found them, so far as my knowledge extends, to lack utility, and to fail in effecting the purpose for which they were designed, and I do not believe that the combination of materials herein described has ever before been known or used.

The quantity of plumbago, brick-dust, and mineral paint contained in this cement has the effect of preserving from oxidation the surface of the joint to which it is applied, and also enables it to withstand sudden changes of temperature, while the joint may be broken at any time, either while hot or cold, and the cement removed without trouble. This cement may also be applied to a very rough joint with better results than are obtained from other cements, owing to its being combined with linseed-oil and finely-divided hemp. It does not crack or break from the expansion or contraction of the joint to which it is applied, and, while it does not immediately set hard, it is so tenacious that it will hold firmly under full working-pressure, and may yet be easily removed for any necessary repairs. Therefore,

I claim as new and desire to secure by Letters Patent—

The cement for steam-joints herein described, consisting of mineral paint, yellow ocher, Paris white, plumbago, brick-dust, and litharge, combined with fine-cut hemp and boiled linseed-oil, substantially as set forth.

In testimony whereof I have hereunto affixed my signature.

SAMUEL OTLEY.

Witnesses:
ALBERT H. HITCHCOCK,
JOHN B. GRIDLEY.